INVENTOR.
HOWARD F. HENDRICKS
BY
ATTORNEY

INVENTOR.
HOWARD F. HENDRICKS
BY
ATTORNEY

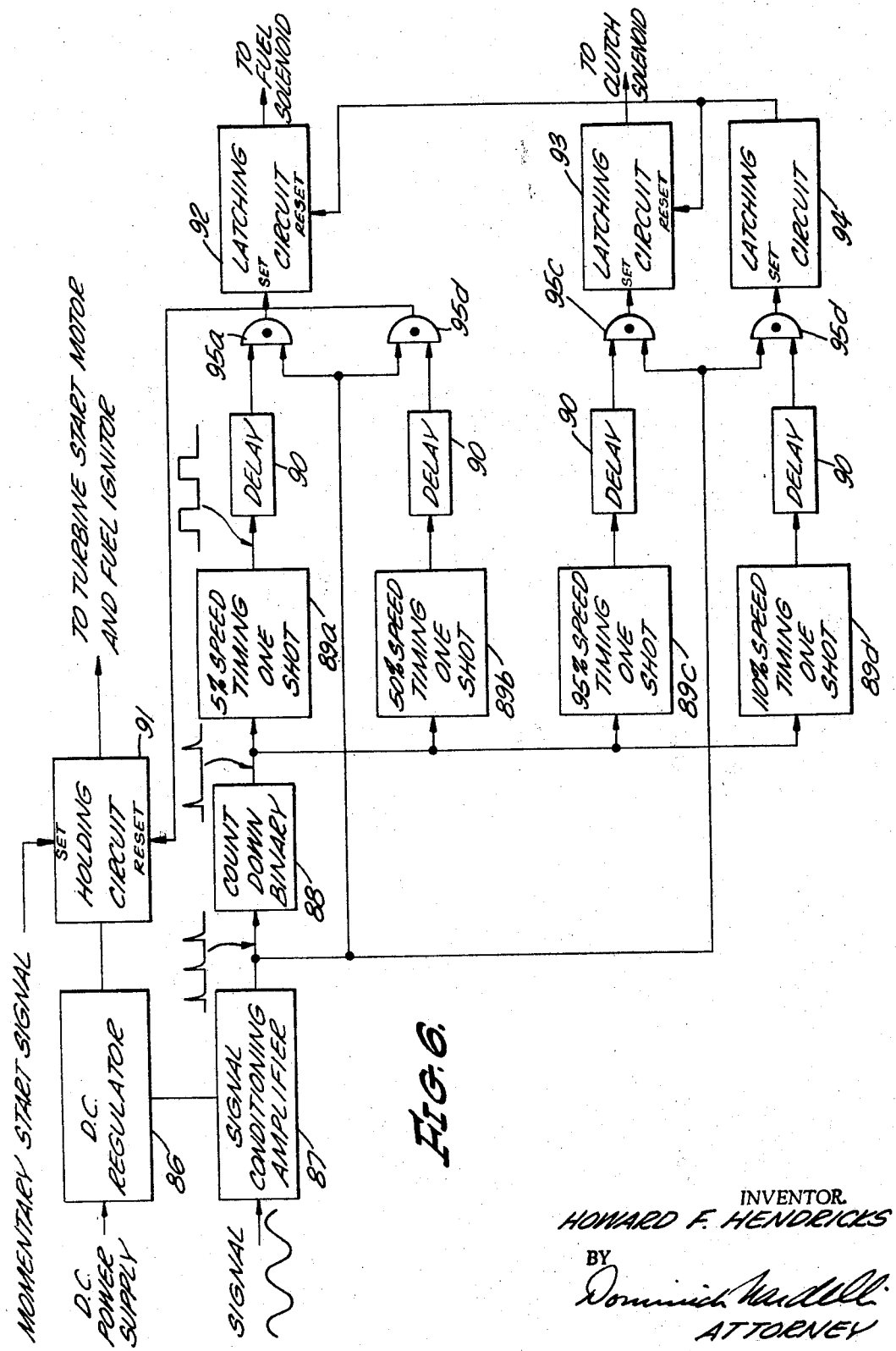

United States Patent Office 3,422,619
Patented Jan. 21, 1969

3,422,619
ELECTRONIC CONTROLS FOR HIGH-SPEED MACHINERY
Howard F. Hendricks, Tempe, Ariz., assignor to The Garrett Corporation, Los Angeles, Calif., a corporation of California
Filed June 6, 1966, Ser. No. 555,493
U.S. Cl. 60—39.14                    3 Claims
Int. Cl. F02g 3/00; F02c 9/04; F02c 7/26

ABSTRACT OF THE DISCLOSURE

A speed control for rotating machinery wherein a binary signal or electric pulse is produced to indicate the start of one revolution whereby the time lapse between signals is directly related to the rotating speed. The repetition rate of the signals is measured by comparing the rate to a standard rate and a command signal is generated to indicate the comparison. The command signal is used to control a specific operation of the machinery.

---

This invention relates generally to speed controls for rotating machinery and, more particularly, to an electronic speed control circuit for a high-speed turbine.

Up to now, gas turbine speed control switches were either mechanical or electromechanical devices. These switches had an inherent fault, i.e. the speed sensor had to be located on the rotating shaft at a point removed from the turbine wheel in order to be able to monitor the rotating speed mechanically. Then, if the shaft happened to shear between the turbine wheel and the sensing point, the mechanical speed switch would be sensing a shaft that is slowing down. Therefore, the wrong signal would be relayed to the turbine, causing the turbine speed to "run away."

An object of this invention is to provide an improved speed control system for high-speed machinery.

Another object of this invention is to provide an electronic speed control circuit for a gas turbine which circuit responds uniformly over a broad frequency band and to a wide range of signal levels and is independent of noise frequency, signal amplitudes and power supply voltage.

Another object of this invention is to provide an electronic circuit which programs the operation of a gas turbine from start-up to overspeed.

Briefly, the invention comprises a magnetic pickup means that generates an alternating signal having a frequency proportional to the rotating speed of a turbine shaft. The pickup means being, for example, a magnetic head could be placed close to the turbine wheel where there may be provided, for example, a hexagon cross section on the shaft. Then, as the shaft rotates and the high points of the hexagon cross section move close to and away from the air gap in the magnetic head, the alternating signal is formed. In order to provide a signal which is proportional to the rotating speed and independent of the alternating signal's amplitude and shape, circuit means are provided to produce a digital signal for each cycle of the alternating signal. Then the repetition rate of the digital signals are timed by comparing one or more standard signals with the repetition rate of the digital signals. When a comparison is made with any one of the standard signals denoting that the machinery is rotating at a given speed, a control signal is generated which controls a specific operation for the gas turbine.

Figure 1:
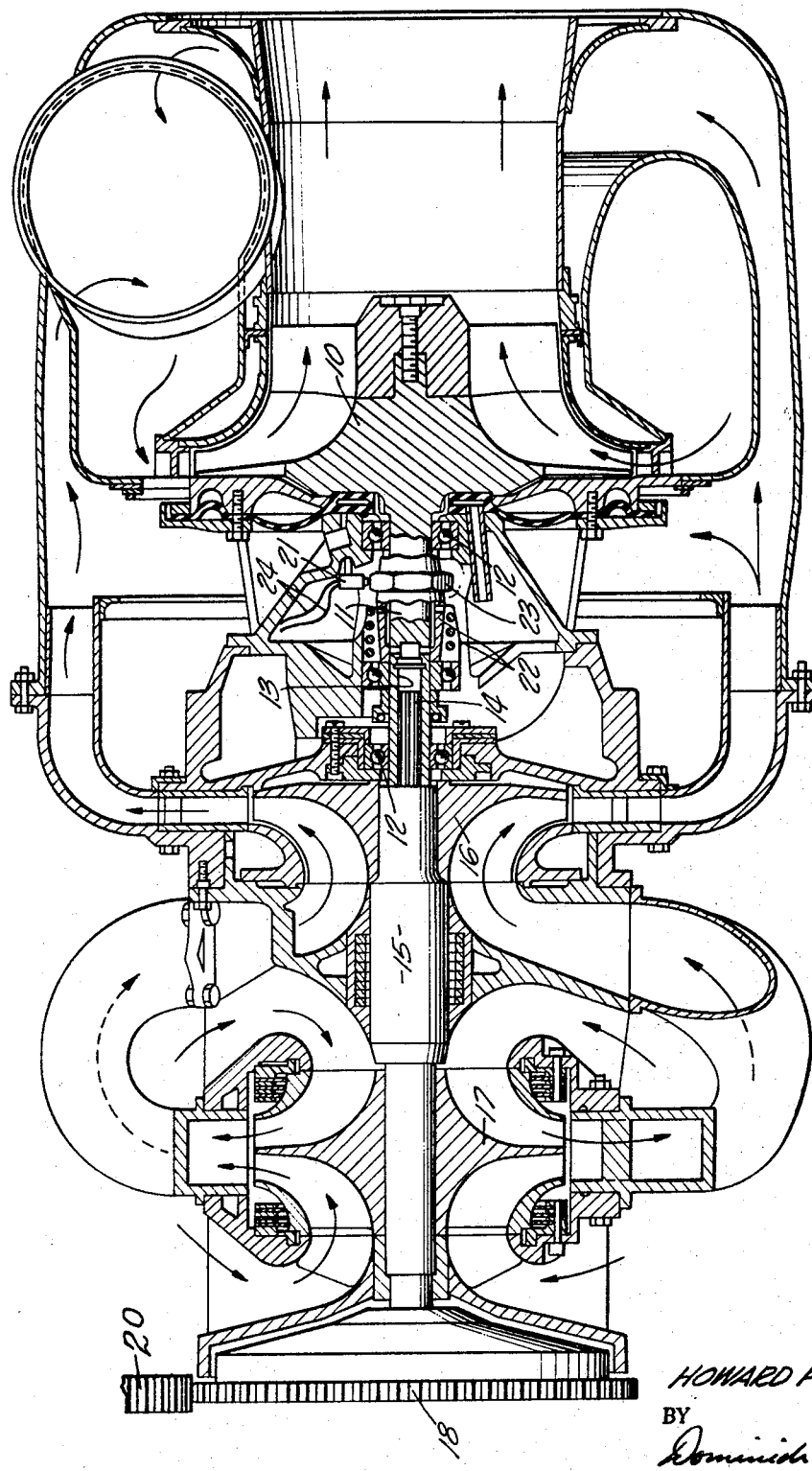
Figure 2:
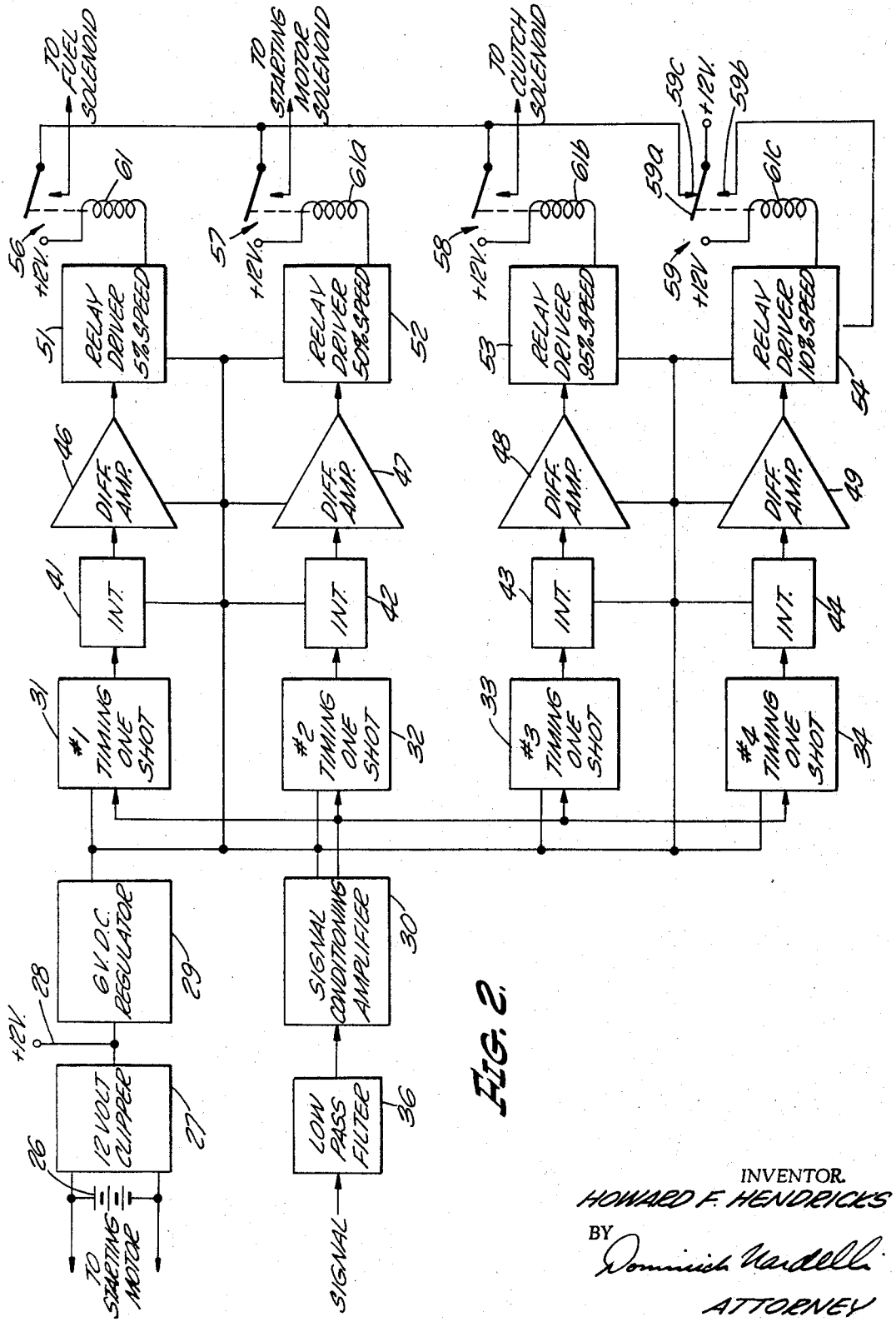
Figure 3:
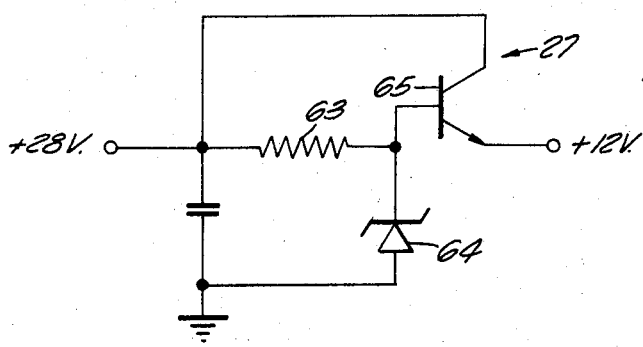
Figure 4:
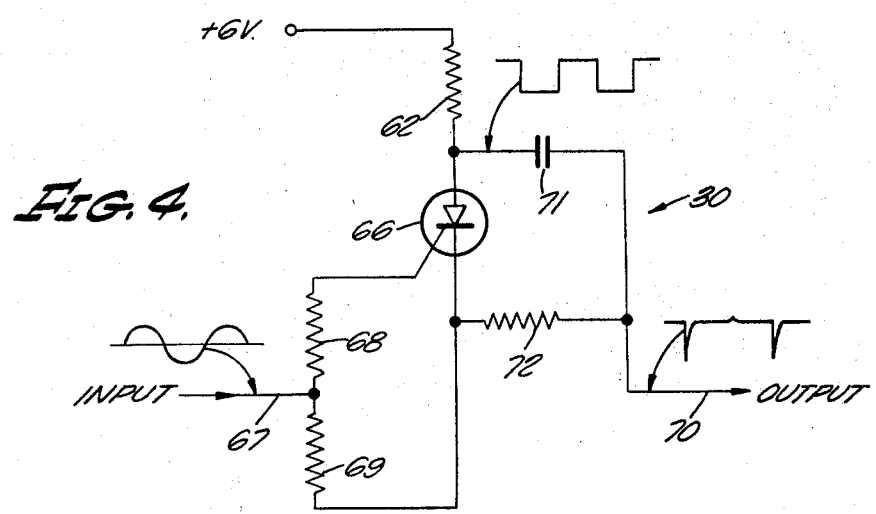
Figure 5:
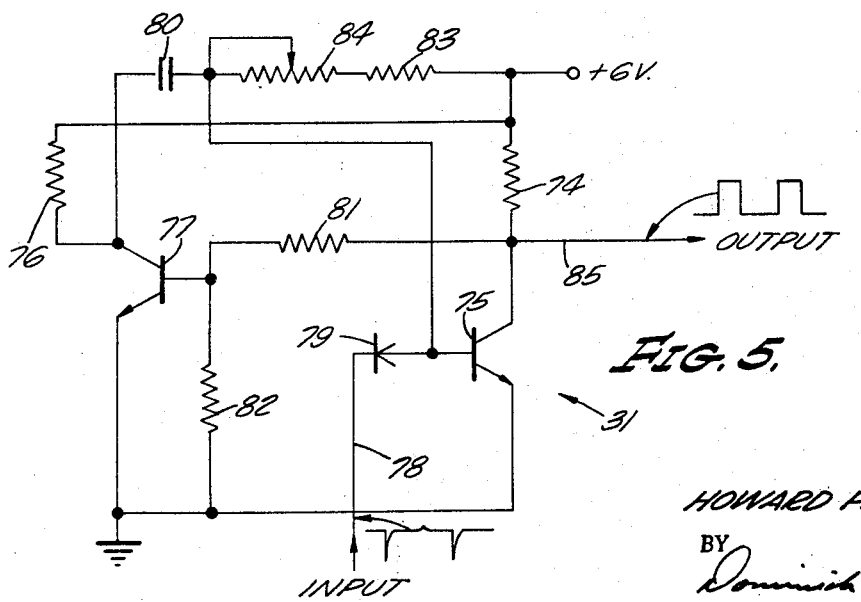

These and other objects, features and advantages will become more apparent from the following description of the invention and shown in the accompanying drawings in which:

FIG. 1 is a longitudinal axial sectional view of an exemplary gas turbine incorporating the invention;
FIG. 2 is a block diagram illustrating one embodiment of the invention;
FIG. 3 is a schematic of one embodiment of a voltage regulator circuit shown in FIG. 2;
FIG. 4 is a schematic of one embodiment of the signal conditioner amplifier, shown in FIG. 2;
FIG. 5 is a schematic of one embodiment of a timing one-shot shown in FIG. 2; and
FIG. 6 is a block diagram illustrating another embodiment of the invention.

Referring to FIG. 1, although the invention is shown in combination with a gas turbine which is, for example, of the type disclosed in U.S. Patent No. 3,163,003, the invention is not limited for use with the particular turbine. The gas turbine includes a turbine wheel 10 formed integrally with a shaft 11. The shaft 11 is suitably mounted by two ball bearings 12 to the turbine housing. At the left end of the shaft 11 is formed an internal spline 13 which cooperates with an external spline 14 on an axle 15. The axle 15, in turn, engages compressor impellers 16 and 17 and a flywheel 18. Power may be coupled from the engine through the flywheel 18 engaging a clutch (not shown). A gear 20 that is powered by a suitable starting electric motor (not shown) engages the gear teeth on the flywheel 18. The above-mentioned components of the gas turbine are old in the art; however, to incorporate the present invention with the gas turbine shown in FIG. 1, an electronic speed sensor means is combined with the turbine. The electronic speed sensor means includes, for example, a magnetic head 21, mounted on the turbine housing close to the shaft 11 between ball bearings 12. Since the magnetic head includes, for example, a small horseshoe permanent magnetic with a pickup coil, to detect changes in the magnetic field, means are provided on the shaft 11 to vary the reluctance of the magnetic path for the magnetic head relative to the rotational speed of the shaft. This is accomplished by forming, for example, on a bearing spacer 22 (which spaces the two ball bearings 12) a hexagon cross section 23. The space 22 is made of a magnetic material and is keyed to rotate with the shaft 11. As shown in FIG. 1, the electronic speed sensor can be placed very close to the turbine wheel 10, so that if the shaft 11 does shear it would not shear between the sensor and the turbine wheel; therefore, the sensor would always be sensing the speed of the turbine wheel.

As the shaft 11 rotates, the ridges on the hexagon cross section 23 pass closer to the magnetic head 21 than the flat portion on the section 23, thus changing the magnetic field and inducing a current in the pickup coil in the head. Since the magnetic field increases and diminishes six times every shaft revolution, the induced current would be an alternating current or signal wherein every six cycles indicate one shaft revolution. The alternating signal is coupled by suitable leads 24 to the circuit, shown in block form in FIG. 2, and compared with a clock or timing signal to give an accurate indication of the speed of the turbine.

The block diagram as shown in FIG. 2 is powered by a battery 26 which has, for example, a 28-volt rating. In addition, the battery 26 also could supply power to the starting motor for the turbine. Since the starting motor draws a relatively large current from the battery, the terminal voltage of the battery 26 could vary between 10 volts and 28 volts, at the same time that the speed control circuit is required to operate reliably. Therefore, a voltage clipper circuit 27 is provided which poduces an output of 12 volts on a lead 28 whenever the terminal voltage of the battery 26 is 12 volts or more.

However, if the terminal voltage drops below 12 volts, the voltage on lead 28 would be the same as the terminal voltage of the battery. The 12 volts from the clipper circuit 27 are used to operate various relays which have a 12-volt rating, as will be explained hereinafter. Since the voltage on lead 28 may fall below 12 volts, the voltage is further regulated to ensure reliable operation of the electronic components. The 12-volt supply is regulated, by a voltage regulator circuit 29, to a voltage of 6 volts. The 6 volts are coupled from circuit 29 to the various circuits as shown to supply power thereto.

The control circuit of FIG. 2 operates as follows: When the starting switch (not shown) is closed, the starting motor and fuel igniter (not shown) for the turbine are activated. Circuit means (not shown) hold the starting switch closed. As the gear 20 of the starting motor rotates the flywheel 18, the turbine wheel 10 and shaft 11 of the gas turbine rotate. The magnetic head 21 in combination with the rotating hexagon cross section 23 on the turbine shaft 11 produce an alternating signal. The alternating signal is coupled to a low pass filter 36 and then to a signal conditioning amplifier 30. The function of the low pass filter 36 is to block high frequency noises (for example, above 50,000 cycles per second) and the function to the signal conditioning amplifier is to convert the alternating signal to a binary signal, i.e., a binary signal is produced for every cycle of the input alternating signal. Since the amplitude of the input alternating signal varies with the rotating speed of the turbine wheel, the amplifier produces binary signals of equal amplitude regardless of the rotational speed. The binary signals are coupled from the amplifier 30 and fed to four timing one-shots 31–34. Each one of the one-shots produces a square signal, i.e., the output of each one-shot consists of a signal having a controlled amplitude and pulse width. The square shape signal as produced by one of the one-shots has a different time duration than the signals produced by the other one-shots for reasons that will become apparent. Each square wave signal as produced by one of the one-shots is coupled to a respective one of four integrator circuits 41–44 as the timing one-shots 31–34 are coupled to integrators 41–44, respectively. Each integrator circuit produces an output voltage which is proportional to the repetition rate of the binary signals which have actuated the one-shots. The four integrator circuits 41–44 are coupled to four differential amplifiers 46–49, respectively, and when the voltage on the output of a respective integrator reaches a predetermined level, one of four relay drivers 51–54, respectively, is actuated by the respective differential amplifier, and a respective relay switch 56, 57, 58, or 59 is acutated.

In the embodiment shown in FIG. 2, the timing one-shot 31 is set to produce a width on the square signal, so that when the starting motor builds up the speed of the turbine wheel to 5 percent of normal operating speed, the output voltage of the integrator 41 would be sufficient to cause the differential amplifier 46 to actuate the relay driver 51. The relay driver 51 grounds one end of a solenoid 61 which has the other end coupled to the 12 volts on lead 28, and switch 56 closes. When switch 56 closes, 12 volts are supplied to a fuel solenoid (not shown) to feed fuel to the turbine. The starting motor remains energized to help the turbine accelerate to operating speed.

In addition, the timing one-shot 32 is set to produce a smaller width square signal than the width produced by one-shot 31, so that when the turbine speed reaches 50 percent of its normal operating speed, the output voltage of integrator 42 would be sufficient to cause the differential amplifier 47 to actuate the relay driver 52. The driver 52 grounds one end of solenoid 61a, which, like solenoid 61, has its other end coupled to the 12-volt supply. Relay switch 57 is closed and 28 volts are supplied to a solenoid to open the starting motor switch (not shown). The starting motor is no longer needed as the turbine would accelerate to its normal operating speed provided that no power is coupled from the turbine.

To indicate when the turbine is near operating speed, for example, 95 percent of operating speed, so that power could be coupled therefrom, the one-shot 33 is set to produce a width on the square signal so that when the speed of the turbine is 95 percent of operating speed the output voltage of integrator 43 has a value to cause amplifier 48 to actuate relay driver 53. Relay driver 53, like relay drivers 51 and 52, energizes solenoid 61b, closing switch 58. When switch 58 closes, 28 volts are coupled to a clutch solenoid (not shown) which when energized causes the clutch (not shown) to engage the flywheel 18 to allow power to be coupled from the turbine. Since the turbine is almost up to operating speed, it does not tend to slow down under load and is able to accelerate to full operating speed.

In case, for some reason, the speed of the turbine rises above its operating speed, the circuit shown in FIG. 2 can also detect when this condition occurs and shuts down the turbine. For example, if the maximum allowable speed is 110 percent of the operating speed, the timing one-shot 34 is set to produce a width on the square signal, so that when the speed of the turbine is 110 percent of the operating speed, the output voltage of the integrator 44 has a value to cause the differential amplifier to actuate relay driver 54. Relay driver 54, like relay drivers 51–53, energizes solenoid 61c, causing an armature 59a on switch 59 to touch contact 59b. Thus, power is removed from contact 59c and coupled to contact 59b. Since contact 59c is coupled to the armatures of switches 46, 47 and 48, power is removed from these switches, shutting off the fuel supply and causing the turbine to stop. The relay switch 59 is latched in the position with armature 59a touching contact 59b since the 12-volt power is coupled back to the relay driver 54. The turbine cannot be started until the relay driver 54 is unlatched, providing a safety feature.

In the embodiment shown in FIG. 2, the widths of the four square signals have a different time duration. This arrangement needs one voltage standard (6 volts) to which the output voltage of the four integrators 31–34 is compared. However, if four voltage standards are available, only one timing one-shot and one integrator would be required. The output voltage of the integrator would be coupled to four different differential amplifiers which have the four voltage standards, respectively, coupled thereto. Then, as the turbine starts up and when the voltage on the output of the integrator compares with the lowest voltage standard, one differential amplifier would produce a control signal. When the voltage on the output of the integrator compares with the next highest voltage standard, another one of the differential amplifiers would produce a control signal, etc.

In the above description, one square pulse is produced for each binary signal; however, one square pulse could be produced for each group of binary signals, provided that the number of binary signals in the group are fixed for the system, i.e., the frequency of the square pulses is directly proportional to the frequency of the binary signals.

Having described the overall operation of the system, the various circuit components will now be described. A schematic of the voltage clipper circuit 27 is shown in FIG. 3. This circuit has the advantage of having a relatively high efficiency. Across the battery 22 is coupled a resistor 63 and a Zener diode 64 in series. The junction of resistor 63 and diode 64 is coupled to the base of an NPN transistor 65 whose collector is coupled to the positive terminal of the battery 26. The resistor 63 limits the current through the diode 64 to a relatively low value, but sufficiently high so that the diode 64 produces a Zener voltage thereacross. Since its Zener voltage is coupled to the base of the transistor 65, the voltage at the emitter would be the Zener voltage times the gain of the transistor. Since the 28-volt power supply can vary from about 10 volts to 28 volts, the current through the diode 64 will vary; however, the Zener voltage of the diode does not vary as long as the current is above the Zener current. In this embodiment, the value of the resistor 63 is 400 ohms so that the maximum current through the Zener diode is less than .1 of an ampere, indicating that relatively low power is dissipated by the diode 64. A similar circuit is used in the 6-volt regulator circuit 29.

A schematic of the signal conditioning amplifier 30 is shown in FIG. 4. A feature of this circuit is that a negative spike pulse representing the binary signal and having a given value is produced for each cycle of the input alternating signal, regardless of the frequency and the amplitude; however, the amplitude of the alternating signal should be above a minimum value or threshold. The amplifier 30 consists of a resistor 62 and a silicon controlled rectifier 66 coupled in series across the 6-volt power supply. The rectifier 66 is normally off and is turned on when the alternating current coupled to an input lead 67 is positive and above threshold level which is, for example, about 1 volt. The input lead is coupled to the junction of resistors 68 and 69 which are connected in series with the rectifier and ground. The junction of resistor 62 and rectifier 66 is coupled to an output lead 70 through a capacitor 71. The lead 70 is coupled to ground through a resistor 72. When the rectifier 66 is not conducting, the capacitor 71 is charged to 6 v. When the positive potential of the alternating signal applied to lead 67 is above the threshold level, the rectifier conducts current. Thus, the voltage of the junction of resistor 62 and rectifier 66 drops almost to ground level and the capacitor 71 discharges through resistor 72, causing the voltage on lead 70 to drop suddenly to a negative value, for example, almost to minus 6 volts, and rise suddenly to ground level. As soon as the value of the alternating current drops below threshold, the rectifier 66 stops conducting because the resistor 62 limits the current flow below the level required to keep the rectifier 66 conducting. The voltage rise on the output lead 70, when the rectifier switches off, does not rise as fast or as high as the voltage drop when the rectifier is switched on because the value of resistor 62 is larger than resistor 72, for example, ten times larger.

A schematic of the timing one-shots, for example, the timing one-shot 31, is shown in FIG. 5. The timing one-shot has two series circuits connected in parallel across the 6-volt potential. One series circuit includes a resistor 74 connected to the collector of an NPN transistor 75, and the other circuit includes a resistor 76 connected to the collector of an NPN transistor 77. The base of transistor 75 is connected to an input lead 78 through a blocking diode 79 and is also connected to the collector of transistor 77 through a capacitor 80, while the base of transistor 77 is connected to the collector of transistor 75 through a resistor 81 and is also connected to ground through a resistor 82. The value of the resistors are chosen so that transistor 75 is normally conducting. Thus, transistor 77 is not conducting since its base · a ground potential. When a negative pulse appears on the input lead 78 the transistor 75 is turned off, causing the potential of its collector to rise, and in turn, the potential of the base of transistor 77 rises, turning on transistor 77. The potential of the collector of the transistor 77 drops to ground potential. Thus, capacitor 80 charges through a resistor 83 and potentiometer 84. The potential on the lead connecting the capacitor 80 to the base of transistor 75 rises with a given time constant as determined by the resistance value of resistor 83 and potentiometer 84 and the capacitance value of capacitor 80. When the potential of the base of transistor 75 rises sufficiently the transistor 75 turns on and transistor 77 turns off. The wave form of the voltage on the collector of transistor 75 is, as shown, on an output lead 85. The time that the potential on lead 85 is high is controlled by potentiometer 84. To increase this time the resistance of the potentiometer is increased.

Thus, the wave form on the output lead 85 could be integrated and converted by one of the integrator circuits 31–34 to a voltage whose value is determined by the frequency of the wave form. Then the converted voltage is compared with a standard voltage, which represents a standard frequency, by one of the differential amplifiers 46–49. When the voltage values are equal, the frequency of the alternating signal is equal to the standard frequency, and a signal is produced by the respective differential amplifiers 46–49 to command an operation to be performed as described above.

In the above-described embodiment analogue, information (frequency) is converted to digital information in order to eliminate any errors due to amplitude and inherent voltage drifts in the circuits. Then the digital information is reconverted to an analogue voltage and compared with a standard voltage. The advantage obtained by reconverting the information back to analogue is that transient noises in the system may appear as a binary signal. By converting back to analogue value, the noise signal has very little affect on the accuracy of the control circuit. However, in a relatively noise-free system wherein no extraneous pulses appear which may be intepreted as a digital signal, the digital information is compared directly with a standard signal. This procedure eliminates inherent inaccuracies in reading analogue information. Referring to FIG. 6, an embodiment of such a system is shown in block form. A power supply, such as the battery 26 as shown in FIG. 2, is coupled to a voltage regulator circuit 86 which regulates the voltage to a level of 6 volts to power a signal conditioning amplifier 87, a count-down binary 88, four timing one-shots 89a, 89b, 89c, and 89d, and the four latching circuits 91–94.

The signal conditioning amplifier 87 is similar to the signal conditioning amplifier 30 shown in FIG. 2, except that amplifier produces positive spike pulses for each cycle of the input signal. The four timing one-shots 89a–89d operate similarly to the four timing one-shots 31–34; however, the function of the timing one-shots 89a–89d is to supply a clock or time standard to which the repetition rate of the spike pulses could be compared. The function of the count-down binary 88 is to pass every other binary signal from the signal conditioning amplifier 87 to the four timing one-shots 89a–89d. The count-down binary 88 is not required in the embodiment shown in FIG. 2. The function of the four latching circuits 91–94 is to provide a positive potential on their respective output leads whenever a positive potential is applied to their respective input set leads and to maintain the positive potential until a positive potential is applied to the respective input reset leads.

The circuit in FIG. 6 operates as follows:

When the operator desires to start the turbine, the start button (not shown) is pushed to apply a positive potential to the latching circuit 91. The turbine starting motor and the fuel ignitor (not shown) are energized. As the turbine wheel 10 and shaft 11 rotate, the alternating signal from the magnetic head 21 is coupled to the signal conditioning amplifier 87, which produces a pulse, for each cycle of the alternating signal. These pulses, as produced by amplifier 87, are coupled to the count-down binary 88 and to one of the two leads on each of four AND gates 95a–95d. AND gates 95a–95b are common devices which supply a positive potential on their output only when both inputs are at a positive potential. If either one of the inputs or both inputs are not at a positive potential, the output of the respective AND gate is at ground potential. The positive pulses on the output of the count-down binary 88 are coupled to the inputs of the four timing one-shots 89a–89d which operate similarly to the timing one-shots 31–34. However, the width of the positive square portion of the wave form for one-shots 89a is equivalent to the cyclic period of the alternating signal when the turbine wheel 10 (FIG. 1) is rotating at 5 percent of the operating speed. Since the cyclic period of the alternating signal decreases with increases in speed, the width of the positive square portion, as produced by each of the other timing one-shots 89b–89d, is progressively smaller, representing 50 percent, 95 percent and 110 percent of the normal operating speed of the turbine wheel. The square wave form as produced on the output of each one-shot is coupled to one of the respective delay circuits 90, which delay the wave form for a short time, for example, 10 microseconds, to ensure that the leading edge of the square pulse does not arrive at the respective AND gate at the same time that the spike pulse arrives which pulse initiated the one-shots. For example, the first spike pulse from the signal conditioner amplifier 87 is coupled to the AND gate 95a and also passes through the countdown binary 88 to initiate the first square signal from one-shot 89a. The leading edge of the square signal, since it has been delayed by the respective delay circuit 96, arrives at the AND gate 95a after the first spike pulse has arrived at the AND gate; obviously, the output of AND gate 95a remains at ground potential. Now, if the speed of the turbine wheel 10 is below 5 percent of the operating speed, the second spike pulse from amplifier 87 arrives at the AND gate 95a after the trailing edge of the square signal. Thus, the output of the AND gate 95a is still at ground potential. The second pulse is blocked, by the count-down binary 88, from initiating another square signal. When the turbine wheel 10 rotates at 5 percent of, or faster than, operating speed, the second spike pulse arrives at AND gate 95a before the trailing edge of the square signal and the second spike pulse passes through the AND gate 95a to set the latching circuit 42 and fuel is supplied to the turbine.

The timing one-shot 89b and AND gate 95b are used to detect when the speed of the system reaches 50 percent of the operating speed. These components operate similarly to the components in the 5 percent circuit, but when the second spike pulse passes through AND gate 95b, latching circuit 91 is reset and the starting motor is stopped. When the turbine reaches 95 percent of its operating speed, the one-shot 89c and AND gate 95c allow the second spike pulse to pass through AND gate 95c to allow power to be coupled from the turbine. If the turbine rotates too fast and it reaches a speed which is 110 percent of the operating speed, AND gate 95d passes the second spike pulse to set the latching circuit 94. The latching circuit 94, when set, resets latching circuits 92 and 93 to stop the turbine. Latching circuit 94 preferably remains in the latched state until the turbine operator ascertains the trouble and corrects it.

With the present disclosure in view, modification of the invention would appear to those skilled in the art. Accordingly, the invention is not limited to the exact details of the illustrated embodiments but includes all such modification and variations coming within the scope of the invention as defined in the appended claims.

What is claimed is:
1. In combination with a high-speed rotating machine having means for producing an alternating electrical signal having a frequency directly related to the rotating speed of said machinery, a rotating speed sensor comprising:
    means for producing a pulse signal for each cycle of said alternating signal,
    means for measuring the time lapse between said pulse signals and producing a control signal when the time lapse between the pulse signal is at a predetermined value, and
    said means for measuring the time lapse between said pulse signals includes:
    means for producing a square signal having a predetermined width for each of said pulse signals wherein the leading edge of the square signal is delayed slightly after the trailing edge of the pulse signal initiating the respective square signal,
    an AND gate having coupled thereto said pulse signals and said square signals for producing said control signal when a pulse signal and a square signal are applied to said AND gate at the same time.
2. In the combination of claim 1 wherein:
    a direct current regulator means is provided to supply a controlled voltage to operate said rotating speed sensor,
    said direct current regulator means including
    a Zener diode and a resistor connected in series across a direct current supply,
    a transistor and the load connected in series also across the direct current supply, and
    the base of said transistor connected to the junction of said Zener diode and said resistor.
3. In the combination of claim 1 wherein:
    said machine comprises a gas turbine having a turbine wheel connected to a turbine shaft, and a direct current battery for providing starting power to the starting motor of said gas turbine and operating power to said rotating speed sensor in said combination;
    said means for producing an alternating signal comprising a magnetic head having an air gap and means on said turbine shaft for cycling the magnetic flux in said air gap in direct relationship to the rotational speed of said shaft.

References Cited
UNITED STATES PATENTS

| | | | |
|---|---|---|---|
| 3,049,879 | 8/1962 | Clark | 60—39.14 |
| 3,310,937 | 3/1967 | Smith | 60—39.14 |
| 3,320,741 | 5/1967 | Glista | 60—39.28 |
| 2,492,472 | 12/1949 | Fortescue. | |
| 2,542,499 | 2/1951 | Fortescue. | |
| 2,741,086 | 4/1956 | Machlanski | 60—39.14 |
| 3,028,526 | 4/1962 | Wintrode et al. | 60—39.28 XR |
| 3,151,450 | 10/1964 | Blackaby | 60—39.14 |

JULIUS E. WEST, *Primary Examiner.*

U.S. Cl. X.R.

60—39.28